Figure 1:
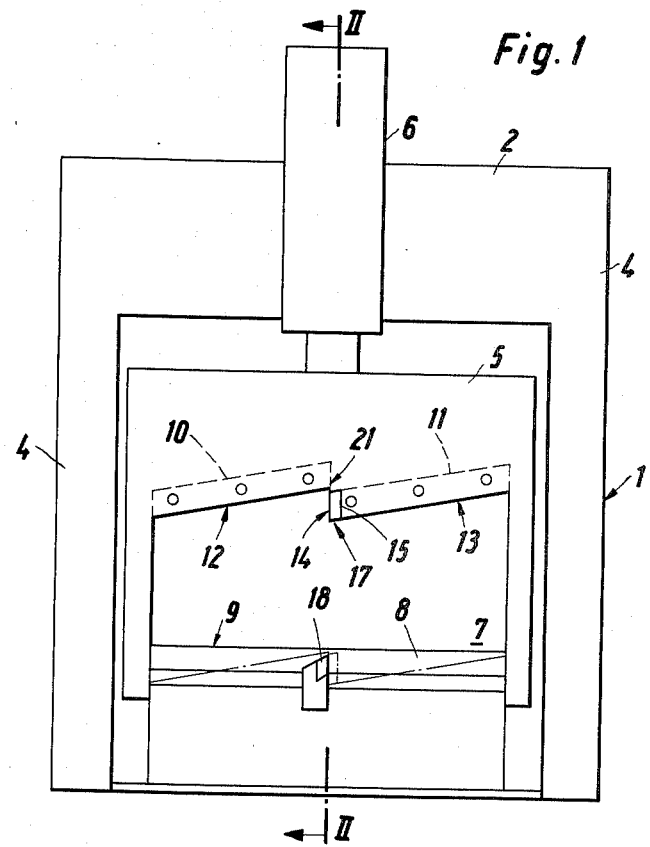

March 15, 1966 F. VAN ENDERT 3,240,094
SHEARING MACHINE
Filed Sept. 22, 1964
6 Sheets-Sheet 1

Inventor:
FRITZ VAN ENDERT
by
Attorney

March 15, 1966     F. VAN ENDERT     3,240,094
SHEARING MACHINE

Filed Sept. 22, 1964     6 Sheets-Sheet 2

Inventor:
FRITZ VAN ENDERT
by

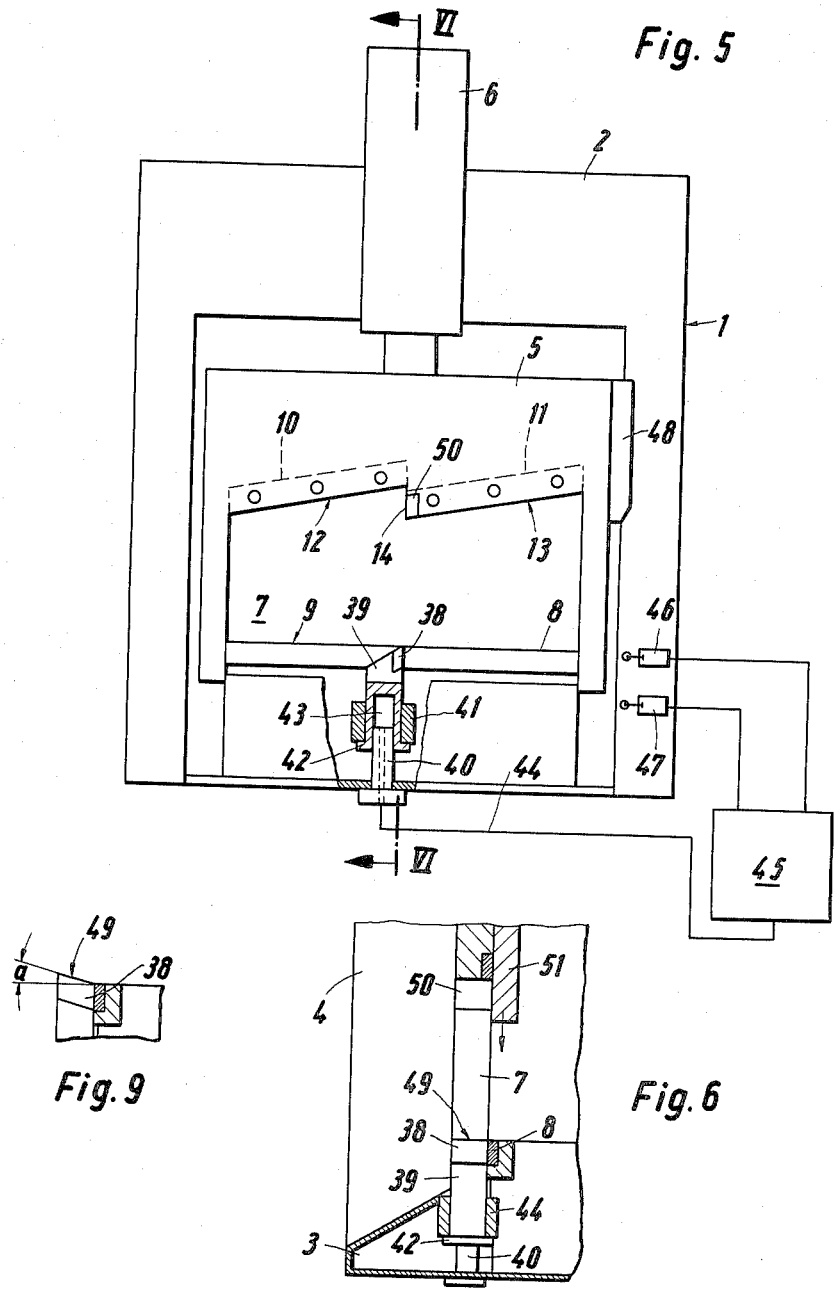

March 15, 1966 F. VAN ENDERT 3,240,094
SHEARING MACHINE
Filed Sept. 22, 1964
6 Sheets-Sheet 5

Inventor:
FRITZ VAN ENDERT
by
Attorney though of course burdensome and time consuming and requires expensive machinery. If, to avoid such disadvantages, shearing machines of smaller width are used to produce correspondingly shorter strips, this requires a preliminary compressing of the material to a width fitting the width of such shearing machine and no real advantage is gained.

United States Patent Office 3,240,094
Patented Mar. 15, 1966

3,240,094
SHEARING MACHINE
Fritz van Endert, Dusseldorf-Oberkassel, Germany, assignor to Lindemann Maschinenfabrik G.m.b.H., Dusseldorf, Germany
Filed Sept. 22, 1964, Ser. No. 398,360
Claims priority, application Germany, Nov. 7, 1963,
L 46,267; Jan. 15, 1964, L 46,781
9 Claims. (Cl. 83—636)

My invention relates to a shearing machine and more particularly to an improvement of such machines of this type which comprise a main cutting blade with an inclined cutting edge located in a main shearing plane transverse to the direction of the feed of material to be cut, a counter cutting blade with cutting edge located in the same plane and a drive for one or both said blades.

The said known machines used for shearing metallic or non-metallic scrap, particularly plate scrap, produce relatively long strips of material which often are unsuitable for immediately following processing and therefore have to be transversely cut in another shearing operation. Thus duplicate work is of course burdensome and time consuming and requires expensive machinery. If, to avoid such disadvantages, shearing machines of smaller width are used to produce correspondingly shorter strips, this requires a preliminary compressing of the material to a width fitting the width of such shearing machine and no real advantage is gained.

It is the main object of my invention to avoid the said disadvantages and to provide a shearing machine which in a single operation produces relatively short strips from material of any width.

According to the basic principle of my invention, I provide the shearing machine additionally with one or more pairs of cross cutting blades which substantially concurrently with the main and counter cutting blades cut the strips produced thereby transversely to the shearing plane into two or more shorter sections. More particularly I subdivide the cutting edge of the main blade in two or more conforming inclined cutting edge sections in serrated formation, each such cutting edge section having one end closer to the counter blade than its other end and leaving a step between the opposing one and other end of neighboring sections, and I associate with each said step one of a pair of cooperating cross blades having a cutting edge extending from said one end of the cutting edge section in angular relation thereto in a plane substantially perpendicular to the said shearing plane, while the other of said pair of cooperating cross blades is associated fixedly or adjustably with the counter blade.

My machine will thus in a single course of action cut the material to be sheared not only in the main shearing plane but also transversely or crosswise at one or more places.

Care of course has to be taken that the multiple cutting edges do not collide while operating. To avoid such collision one cross blade of each pair is so placed, possibly adjustably, that its cutting edge does not intersect the cutting edge of the main blade or counter blade, respectively, with which it is associated; thus the main blade and the counter blade may overlap to complete their cutting operation. This construction is particularly suitable for cutting non-metallic scrap and not too thick metallic sheet or scrap material.

Alternately one of each pair of cross blades may be movably supported relative to the main or counter blade with which it is associated, retracted from its operative position while the main and counter blades cut, and thereafter returned to its initial operative position.

If the main blade is provided with a cutting edge subdivided into three or more edge sections conformingly inclined relative to the cutting edge of the counter blade located within the shearing plane, then at least two cuts are simultaneously started during each cycle of operation of the machine.

The drive for such machine, which accordingly comprises two or more pairs of cooperating cross cutting blades, is thus stressed two or more times more than the drive in a shearing machine which includes a main blade comprising only two inclined cutting edge sections, one intermediate step and accordingly only one pair of cooperating cross blades. Such increased stress on the drive can be avoided if the at least two cutting edge sections with their intermediate steps and the cross blades associated therewith are increasingly distanced from the bottom or counter blade as they follow each other in the direction of the developing cut within the main shearing plane. In this case the cutting edge sections with the associated cross blades start to cooperate consecutively with the bottom blade and its associated cross blades, respectively. The said distance is in many cases advantageously increased at each intermediate step by at least the maximal thickness of the material to be sheared.

Figure 2:
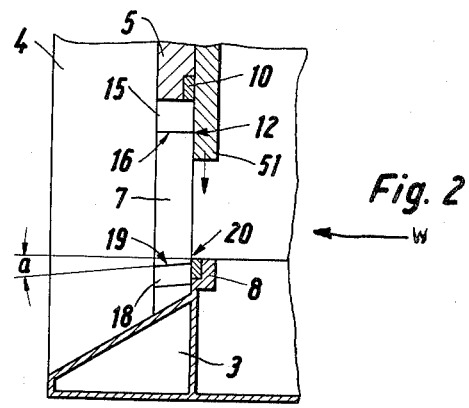
Figure 3:
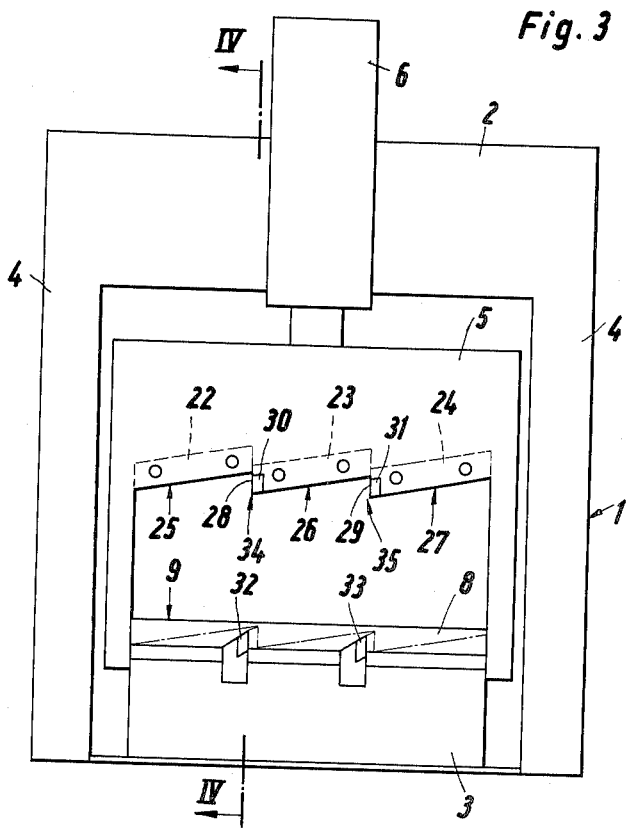
Figure 7:
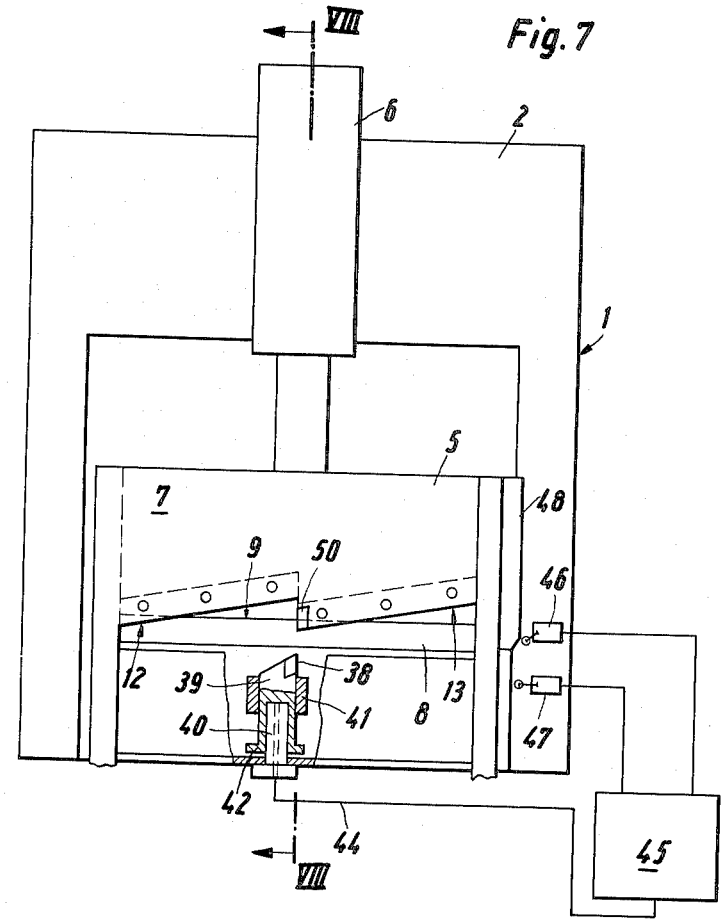
Figure 10:
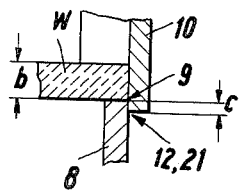
Figure 8:
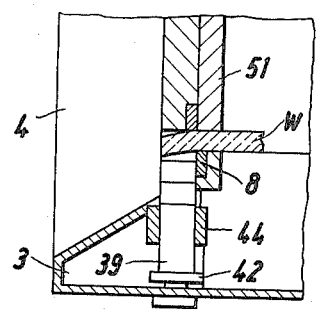

The said and other objects of my invention will be more fully understood from the following specification when read with the accompanying drawing which illustrates four embodiments thereof and shows In FIG. 1 a front view of a first embodiment,
In FIG. 2 a sectional view along the lower portion of line II—II of FIG. 1;
In FIG. 3 a front view of a second embodiment,
In FIG. 4 a sectional view along the lower portion of line IV—IV in FIG. 3,
In FIG. 5 a front view of a third embodiment at the start of the shearing operation,
In FIG. 6 a sectional view along the lower portion of line VI—VI in FIG. 5,
In FIG. 7 a front view of the said third embodiment during the shearing operation,
In FIG. 8 a sectional view along the lower portion of line VIII—VIII in FIG. 7,
In FIG. 9 a front view, partly in section, of a modification applicable to the third embodiment,
In FIG. 10 an enlarged schematical cross sectional view of the top blade and the bottom blade after completion of the shearing operation,
In FIG. 11 a front view of a fourth embodiment of my invention, and
In FIG. 12 a sectional view along line XII—XII in FIG. 11.

In the drawing the same reference numerals indicate the same or equivalent elements of my shearing machine.

Each of the four illustrated embodiments comprises a guillotine frame 1 formed by two uprights 4, a crosshead 2 and a base 3, and include a main or top blade and a counter or bottom blade. The main or top blade is mounted on a support 5 which is slidably guided in said uprights 4 and is reciprocated by a hydraulic ram 6 or the like for cooperation with the counter or bottom blade 8 mounted in operative relation thereto on the base 3. The said two blades respectively their cutting edges define the shearing plane. The material to be sheared is introduced into the unobstructed aperture 7 between the counter or bottom blade and the raised main or top blade in the direction of arrow w of FIG. 2. The bottom blade 8 has a cutting edge 9 which extends substantially horizontally over the full width of said aperture 7. It will be understood that the said two blades may operate in a vertical plane as shown in a horizontal or even in an inclined shearing plane.

The cutting edge of the top blade is composed of a plurality of conformingly inclined cutting sections in serrated formation leaving a step between the apex of one section and the opposing lower end or beginning of the following other section. If desired and as shown the main or top blade may be composed of two or more component blades each provided with one of said inclined cutting edge sections.

In the first embodiment illustrated in FIGS. 1 and 2 the top blade is composed of two component blades 10 and 11 each of which is provided with an inclined cutting edge section 12 and 13, respectively. These cutting edge sections are in serrated formation leaving a step 14 between the apex 21 of edge 12 and the lower end 17 of edge 13.

A top or first cross blade 15, secured to the bottom face of the support 5 at the plate of said step 14, is provided with a horizontal cross cutting edge 16 which projects in angular relation to the cutting edge 13 from its said lower end forwardly substantially in the direction $w$ of the material feed.

A second or bottom cross blade 18 with cutting edge 19 is mounted on base 3 in operative relation to the said top cross blade 15. Its cutting edge 19 is preferably inclined by an angle $a$ and it is preferably adjustable in vertical direction as will be explained hereinafter.

When the blades of this embodiment cut a workpiece such as a piece of sheet metal extending substantially over the width of the aperture 7, the cut starts at the intersection 17 of the cutting edge section 13 and the cross cutting edge 16. If the cutting edge 19 of the lower cross blade 18 extends through a point 20 on cutting edge 9 of the bottom blade 8, actually two cuts are simultaneously started in orthogonal relation namely between the cutting edges 9, 13 and 16, 19, respectively. Such cross cutting will occur simultaneously with, or shortly before or after, the cutting by the edges 9 and 12 which produce a cut in alignment with that executed by the cutting edges 9 and 13.

If, as indicated above, the cutting edge 19 of the cross blade 18 would cross the cutting edge 9 namely would pass through point 20 thereof, the cutting edges 9 and 12 would be prevented from overlapping and from completing the cut. Therefore, as shown in FIGS. 1 and 2, cross blade 18 with cutting edge 19 is downwardly sufficiently offset from edge 9. The degree of such offset will be understood from FIG. 10 wherein $w$ indicates the workpiece, $b$ its thickness, and $c$ the required amount of overlapping of the top and bottom blades. The cutting edge on cross blade 18 is therefore downwardly offset by an amount slightly exceeding the desired overlap $c$ and determined by known principles.

Figure 4:
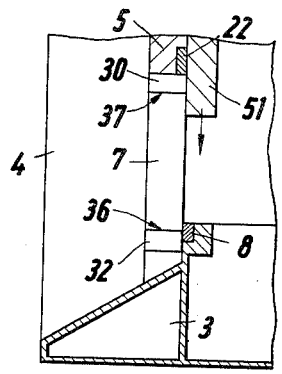

The second embodiment shown in FIGS. 3 and 4 differs from that described before merely therein that the top blade is composed of more than two for example three component blades 22, 23, 24 having conformably inclined cutting edges 25, 26, 27, respectively, in serrated formation separated by the steps 28, 29. At each of these steps an upper cross blade 30 and 31 is attached to the bottom face of the slidable support 5 for cooperation with bottom cross blades 32, 33, respectively, mounted on base 3; the cut of the workpiece starts simultaneously at the intersection points 34 and 35 of the cutting edges 26, 27 with cutting edges of cross blades 30, 31, respectively. The cutting edges 36 of the bottom cross blades 32, 33 are in this embodiment horizontal and produce with cooperating cutting edges 37 of the top cross blades 30, 31, a punching cut instead of a true shearing cut.

The third embodiment illustrated in FIGS. 5 to 8 differs from the first embodiment mainly therein that the bottom cross blade 38 is movable in vertical direction; it rests upon a hydraulic prop or jack composed of a stationary vertical piston 40 and a reciprocable cylinder 39. The upward movement of cylinder 39 is restricted for example by the co-operation of a stationary bushing 41 freely surrounding the cylinder and a flange 42 or the like on the bottom end of the cylinder.

The cylinder chamber 43 is connected by pipeline 44 with a hydraulic control system 45 which is governed by the switches 46, 47 mounted on frame 1 which are alternately actuated by the steering ledge 48 associated with the vertically reciprocable top blade support 5. The construction of the control system 45 will be obvious to any expert in view of its desired operation as described hereinafter.

In contrast to the first and the second embodiments wherein the cutting edge of the bottom cross blade is permanently offset from the cutting edge of the bottom blade, in this third embodiment the cutting edge 49 of the displaceable bottom cross blade 38 passes in its initial position through the cutting edge 9 of the bottom blade 8 as apparent from FIGS. 5 and 6 and it remains in such position until the cross blades 38 and 50 have completed a cross cut. During this period the pipe 44 is closed so that the liquid in cylinder chamber 43 maintains the cylinder 39 with cross blade 38 in raised position. After completion of the cut by the cross blades 38, 50 the downwardly moving steering ledge 48 actuates the switch 46 and the same opens the pipeline 44 permitting the liquid to escape from the cylinder chamber 43 so that the cylinder 39 with cross blade 38 will descend under its own weight into the position shown in FIGS. 7 and 8 and the cross blade 38 will not any further obstruct the required overlapping of the top blade component 10 having cutting edge 12 with the bottom blade 8 having cutting edge 9 (see FIG. 10). Once a sufficient preelected overlapping $c$ is accomplished, the switch 47 is actuated by the continuously downwardly moving steering ledge 48 and reconnects the cylinder chamber 43 over pipeline 44 with the hydraulic system 45 so that liquid reenters said chamber and restores the cylinder 39 with the bottom cross blade 38 to its initial raised position while the support 5 with the top blade components 10, 11 returns upwardly.

In this third embodiment the cutting edge 49 of the lower cross blade 38 is horizontal like cutting edge 36 of the second embodiment but it may be slanted like cutting edge 19 in FIG. 2 or in opposite direction like cutting edge 49 in FIG. 9. Such slanting in opposite direction may in fact be applied as well to the cutting edge 19 of the first embodiment shown in FIGS. 1 to 4 provided the cross blade 18 is sufficiently downwardly offset relative to the cutting edge 9 of the bottom blade 8.

Whereas in the shown embodiment the top blade is reciprocable and the bottom blade stationary, this relation may be reversed and my appended claims have to be thus understood. It will also be understood that the top blade may have straight cutting edge like blade 8 in FIG. 1 and the bottom blade may have a serrated cutting edge like the top blade in FIGS. 1, 3 or 11. Further, the top blade and/or the bottom blade may additionally be displaceable in horizontal direction, and if desired, the shearing plane may be horizontal or even inclined instead of vertical as shown. Additionally, as already described before, the top or the bottom cross blades, preferably the latter, is either adjustable as shown in FIGS. 1 to 4 or retractable as shown in FIGS. 5 to 8.

The shearing machine according to my invention may be provided with a known "hold down" device which holds the work immovable during the shearing operation and as shown in FIGS. 2, 4, 6, 8, 12, consists of a ram or clamp 51 actuated in known manner for example hydraulically. Said hold down device may be designed for compressing yieldable such as hollow material, prior to the start of the shearing operation.

Figure 11:
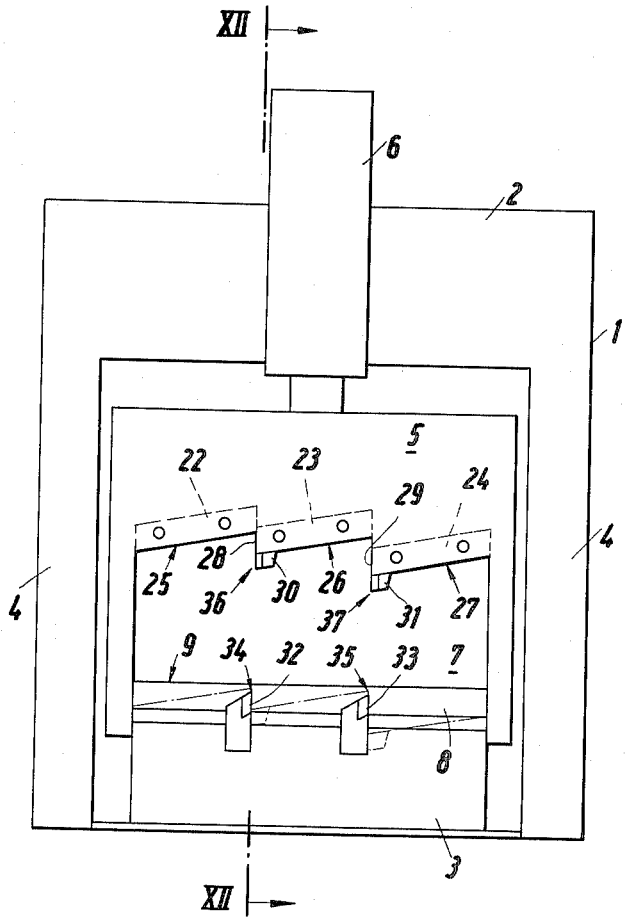
Figure 12:
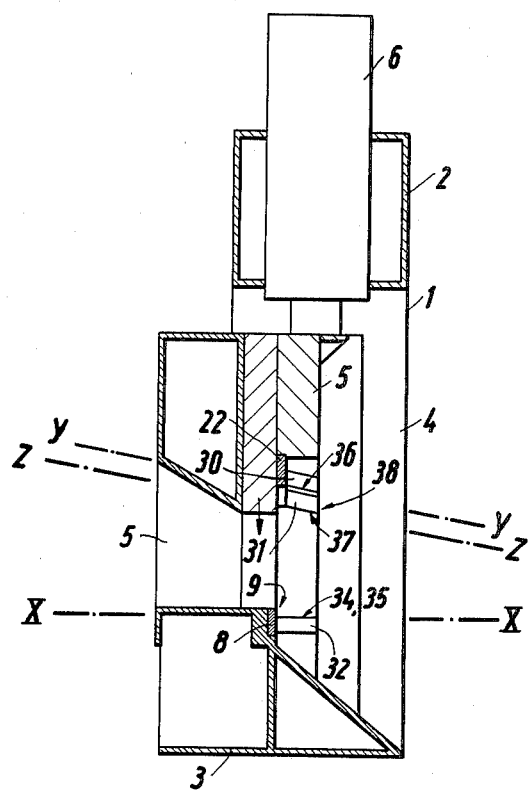

In the fourth embodiment shown in FIGS. 11 and 12 the bottom blade 8 has again a horizontal cutting edge 9 extending over the whole aperture 7 within frame 1 and is associated with bottom cross blades 32, 33. The top blade is composed of a plurality for example three component blades 22, 23, 24 each provided with one of identically inclined cutting edges 25, 26, 27 separated by intermediate steps 28, 29 and each associated with top cross blades 30, 31 having identically slanted cutting edges 36, 37.

The cutting edges 34, 35 of the bottom cross blades 32, 33 are located in a horizontal plane marked X—X in FIG. 12. The parallel cutting edges 36, 37 of the top cross blades 30, 31 are differently distanced from their cooperating bottom cross blade and are located in mutually vertically offset parallel inclined planes marked Y—Y and Z—Z, respectively in FIGS. 12.

When the top blade support 5 descends, the operation begins with the forward end 38 of the cutting edge 37 engaging the material and pressing the same downwardly until cutting edges 35, 37 start to shear. After completion of this shearing cut, the same continues at a right angle between the top cutting edge section 27 and the bottom cutting edge 9. The vertical distance between planes Y—Y and Z—Z is so elected that the cross cutting edges 34, 36 of the next following pair of cross blades 30, 32 and thereafter the cutting edges 9, 26 start to cooperate only after the cut between edges 9 and 27 was completed. The cutting edge 25 starts to operate either concurrently with cutting edge 26 or thereafter. The before described stepwise action of the top blade components and the cross blades reduces stresses in the machine and eases the load upon the hydraulic or other drive 6.

When desired that the cooperating cross blades 30, 31 and 32, 33 perform a drawing cut then the cutting edges 34, 35 may be also inclined like edge 19 in FIG. 2 or edge 49 in FIG. 9. The bottom cross blades 32, 33 may be mounted adjustably relative to the top cross blades 30, 31, respectively as described before regarding cross blade 18 in FIG. 1, or they may be attached to a retractable support constructed in the manner shown in FIGS. 5 and 6.

While I have shown and described several embodiments of my invention to illustrate the principles thereof, it will be understood that my invention can be differently embodied without departing from such principles and without avoiding the scope of my appended claims.

What I claim as my invention is:

1. In a shearing machine for metallic and non-metallic scrap, particularly plate scrap, the improvement comprising in combination
   (a) a main blade including a first cutting edge composed of at least two substantially conformingly inclined cutting edge sections in serrated formation leaving a step between the apex of one cutting edge section and the opposing beginning of the neighboring other cutting edge section;
   (b) a counter blade in operative relation to said main blade having a second cutting edge defining with said first cutting edge the operative shearing plane;
   (c) one of the beforesaid blades being reciprocable and the other substantially stationary;
   (d) at least one first cross blade rigidly associated with the main blade, each such first cross blade projecting from one of said steps in the direction of feeding of the material to be sheared and having a third cutting edge extending substantially from said beginning of said other cutting edge section in angular relation thereto in a plane substantially perpendicular to the shearing plane;
   (e) and at least one second cross blade associated with the counter blade and having in operative relation to the third cutting edge a fourth cutting edge angularly spreading from a point of the counter blade sufficiently distant from the second cutting edge to permit a full operative overlap of the main blade and the counter blade.

2. A shearing machine for metallic and non-metallic scrap according to claim 1 wherein the second cross blade is adjustable relative to the first cross blade in the direction of their mutual approachment.

3. A shearing machine for metallic and non-metallic scrap according to claim 1 wherein the main blade is subdivided into at least two component blades each provided with one of the inclined cutting edge sections.

4. A shearing machine for metallic and non-metallic scrap according to claim 1 wherein the third and the fourth cutting edges are mutually inclined to start their cutting cooperation at their forward end from where the cut proceeds towards the shearing plane and continues in angular relation thereto along the respective cutting edge section.

5. A shearing machine for metallic and non-metallic scrap according to claim 1 wherein the main blade is cluding at least three cutting edge sections and associated with at least two first cross blades, the cutting edge sections with their intermediate steps and first cross blades following each other in the direction of the developing cut within the shearing plane being increasingly distanced, at each step by at least the maximal thickness of the material to be sheared, from the second cutting edge so that the cutting edge sections and the first cross blades start to cooperate consecutively with the second cutting edge and the second cross blades, respectively.

6. A shearing machine for metallic and non-metallic scrap according to claim 1 comprising a main blade including at least three cutting edge sections and associated with at least two first cross blades, the cutting edge sections with their intermediate steps and first cross blades being increasingly distanced from the second cutting edge and the respective second cross blades as they follow each other in the direction of the developing cut within the shearing plane, so that the cutting edge sections and the first cross blades start to cooperate consecutively with the second cutting edge and the second cross blades, respectively.

7. A shearing machine for metallic and non-metallic scrap according to claim 6 wherein the third and fourth cutting edges are mutually inclined to start their cutting cooperation at their forward ends thus performing a drawing cut, and the said substantially uniformly changed degree of said distances between said members is so great that the pairs of cross blades operate one after the other.

8. In a shearing machine for metallic and non-metallic scrap, particularly plate scrap, the improvement comprising in combination
   (a) a vertically reciprocable top blade including a first cutting edge of at least two substantially conformingly inclined cutting edge sections in serrated formation leaving a step between the apex of one cutting edge section and the opposing beginning of the neighboring other cutting edge section;
   (b) a substantially stationary bottom blade in operative relation to the top blade having a substantially horizontal second cutting edge defining with said first cutting edge of the operative vertical shearing plane;
   (c) at least one first cross blade associated with the top blade, each such first cross blade projecting from one of said steps in the direction of feeding of the material to be sheared and having a third cutting edge extending substantially from said beginning of said other cutting edge section in angular relation thereto in a plane substantially perpendicular to the shearing plane;
   (d) and at least one second cross blade associated with the bottom blade and having in operative relation to the third cutting edge a fourth cutting edge angularly spreading from a point of the counter blade sufficiently distanced from the second cutting edge to permit a full operative overlap of the top blade and the bottom blade.

9. In a shearing machine for metallic and non-metallic scrap, particularly plate scrap, the improvement comprising in combination (a) a main blade including a first cutting edge composed of at least two substantially conformingly inclined cutting edge sections in serrated formation leaving a step between the apex of one cutting edge section and the beginning of the neighboring other cutting section;
(b) a counter blade in operative relation to said main blade having a second cutting edge defining with said first cutting edge the operative shearing plane;
(c) one of the beforesaid blades being reciprocable and the other substantially stationary;
(d) at least one first cross blade rigidly associated with the main blade, each such first cross blade projecting from one of said steps in the direction of feeding of the material to be sheared and having a third cutting edge extending substantially from said beginning of said other cutting section in angular relation thereto in a plane substantially vertical to the shearing plane;
(e) and at least one second cross blade associated with the counter blade and having in operative relation to the third cutting edge a fourth cutting edge extending angularly to the second cutting edge, a retractable jacklike support rigidly holding the second cross blade in stationary position relative to and during its cooperation with the first cross blade, and operative means actuating said support to distance the third cutting edge from the second cutting edge thereby permitting an overlap of the main blade and the counter blade, and thereafter returning the second cross blade into initial operative position after the main blade and the counter blade completed their shearing action.

References Cited by the Examiner

UNITED STATES PATENTS 2,188,916  2/1940  Murch _____ 83—44 X

FOREIGN PATENTS 66,830  3/1957  France.

WILLIAM W. DYER, Jr., *Primary Examiner.*

L. B. TAYLOR, *Assistant Examiner.*